(No Model.)
J. B. DOOLITTLE.
BUTTER LIFTER.
No. 452,044. Patented May 12, 1891.
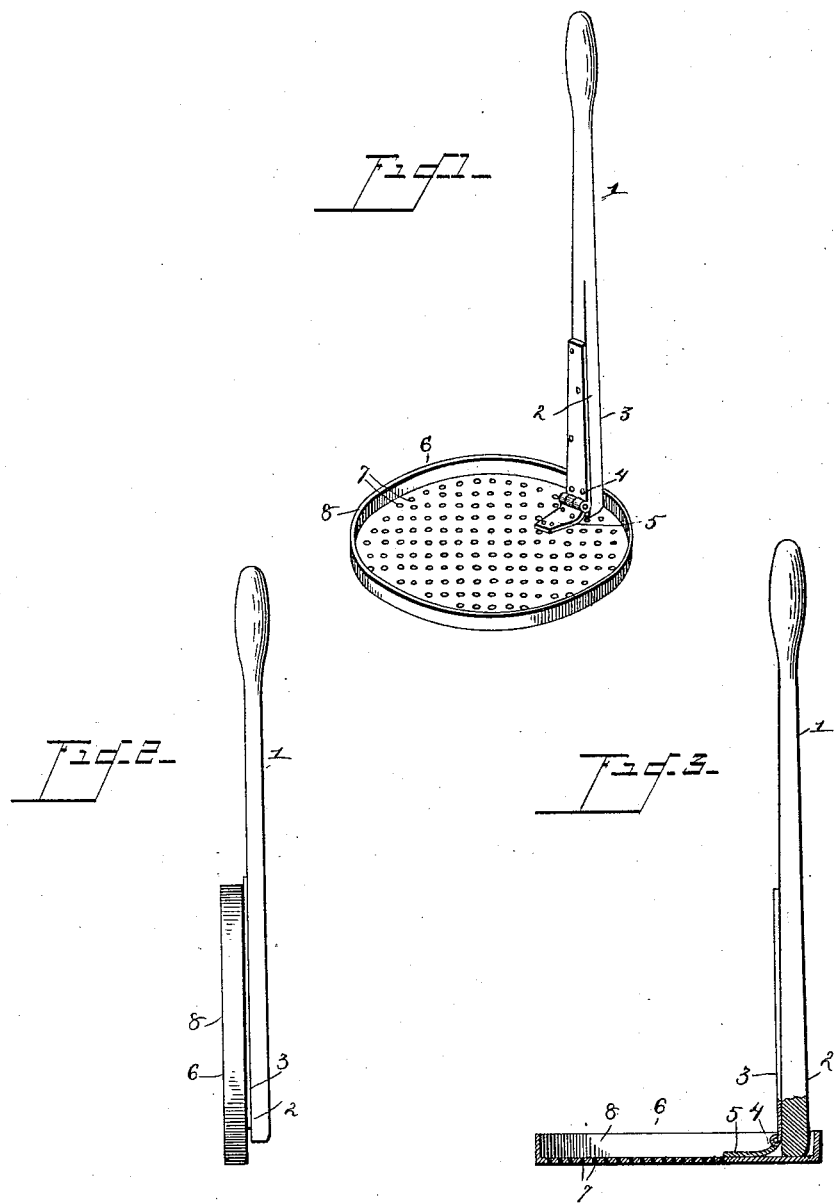
Witnesses
Geo. E. Frech.
H. J. Riley
Inventor
Joseph B. Doolittle
By his Attorneys,
C. A. Snow & Co.

UNITED STATES PATENT OFFICE.

JOSEPH B. DOOLITTLE, OF DOOLITTLE'S MILLS, INDIANA.

BUTTER-LIFTER.

SPECIFICATION forming part of Letters Patent No. 452,044, dated May 12, 1891.

Application filed August 8, 1890. Serial No. 361,447. (No model.)

*To all whom it may concern:*

Be it known that I, JOSEPH B. DOOLITTLE, a citizen of the United States, residing at Doolittle's Mills, in the county of Perry and State of Indiana, have invented a new and useful Butter-Lifter, of which the following is a specification.

The invention relates to improvements in butter-lifters.

The object of the present invention is to provide a simple and inexpensive butter-lifter adapted to be folded and readily inserted in a churn and beneath the surface of its contents and of being opened for the purpose of removing the butter and separating the same from the buttermilk.

The invention consists in the construction and novel combination and arrangement of parts hereinafter fully described, illustrated in the accompanying drawings, and pointed out in the claim hereto appended.

In the drawings, Figure 1 is a perspective view of a butter-lifter constructed in accordance with this invention. Fig. 2 is a side elevation illustrating the plate or strainer folded and in position to be inserted in the body of a churn. Fig. 3 is a sectional view.

Referring to the accompanying drawings, 1 designates a stem or handle, having secured to one of its faces at the end 2 a leaf 3 of a hinge 4, having its pintle arranged approximately at the end of the stem or handle 1. The other leaf 5 of the hinge is secured to the face of a plate or strainer 6. The plate or strainer 6 is provided with perforations 7 and has a circumferential flange 8 extending upward from the face of the plate or strainer 6 when the latter is in a horizontal or operative position, and the leaf 5 of the hinge 4 is secured at one side of the plate or strainer, and when the plate is in a horizontal position and the stem or handle 1 is perpendicular thereto the plate or strainer bears against the square edge of the end 2, and is thereby prevented swinging down below a horizontal position, and is maintained perpendicular to the handle or stem. The strainer or plate 6 is designed to be folded parallel with the handle or stem 1 to facilitate its insertion in the body of the churn and prevent the butter being disturbed, and is turned perpendicular to the stem after insertion, and the butter can be readily separated from the buttermilk and dipped from the churn.

It will be readily seen that the butter-lifter is simple and inexpensive in construction, and is adapted to be folded to facilitate insertion in the churn, and is capable of conveniently dipping out the butter and separating the same from buttermilk.

What I claim is—

A butter-lifter comprising the plate or strainer provided with the circumferential flange, the hinge 4, having one of its leaves secured to the upper face of the plate or strainer and arranged near the edge thereof, and the handle or stem secured to the other leaf and having its end 2 arranged opposite the pintle and adapted to fit squarely against the face of the plate when the latter is perpendicular to it to hold it in its operative position, substantially as described.

In testimony that I claim the foregoing as my own I have hereto affixed my signature in presence of two witnesses.

JOSEPH B. DOOLITTLE.

Witnesses:
JAS. F. JOHNSON,
JOHN STEWART.